Jan. 17, 1950   J. B. STINE   2,494,637
CHEESE MANUFACTURE
Filed March 5, 1947   2 Sheets-Sheet 1
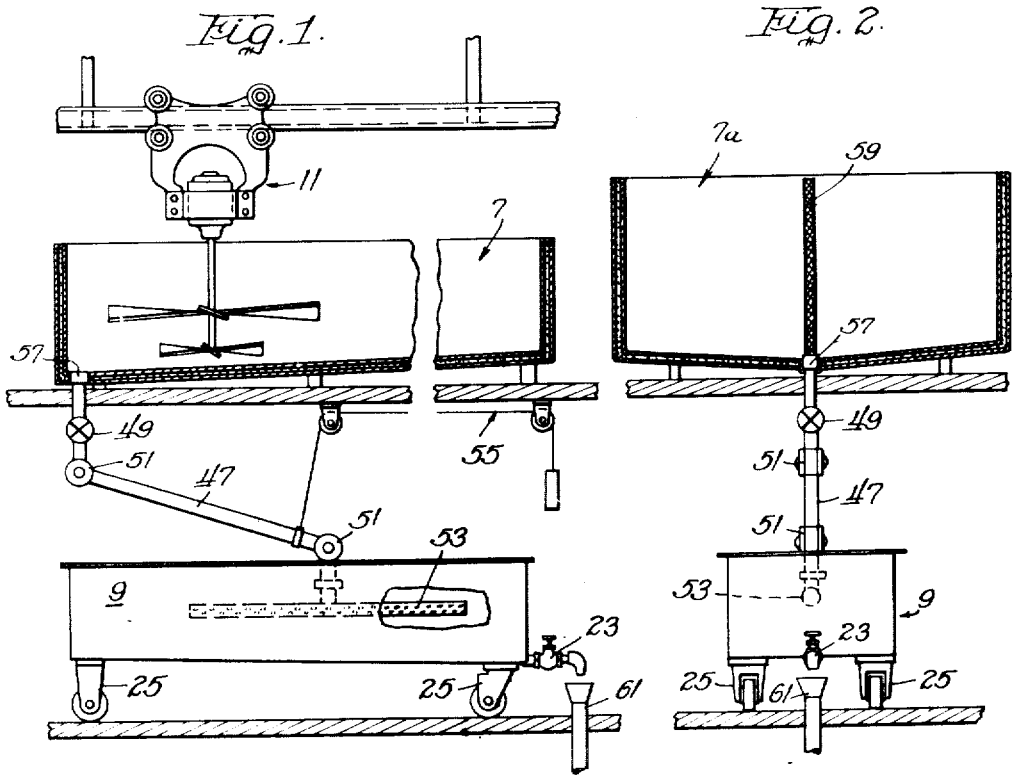
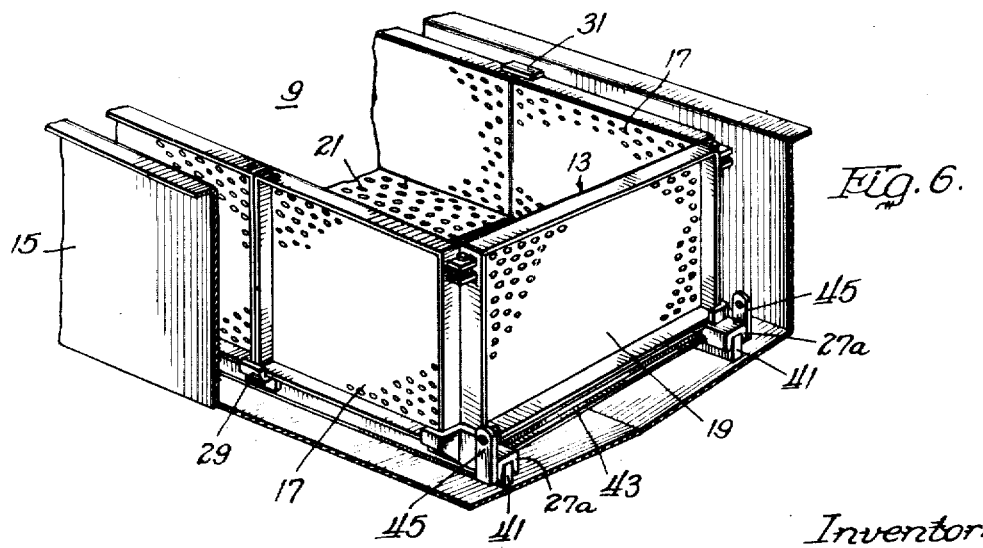
Inventor:
James Bryan Stine.

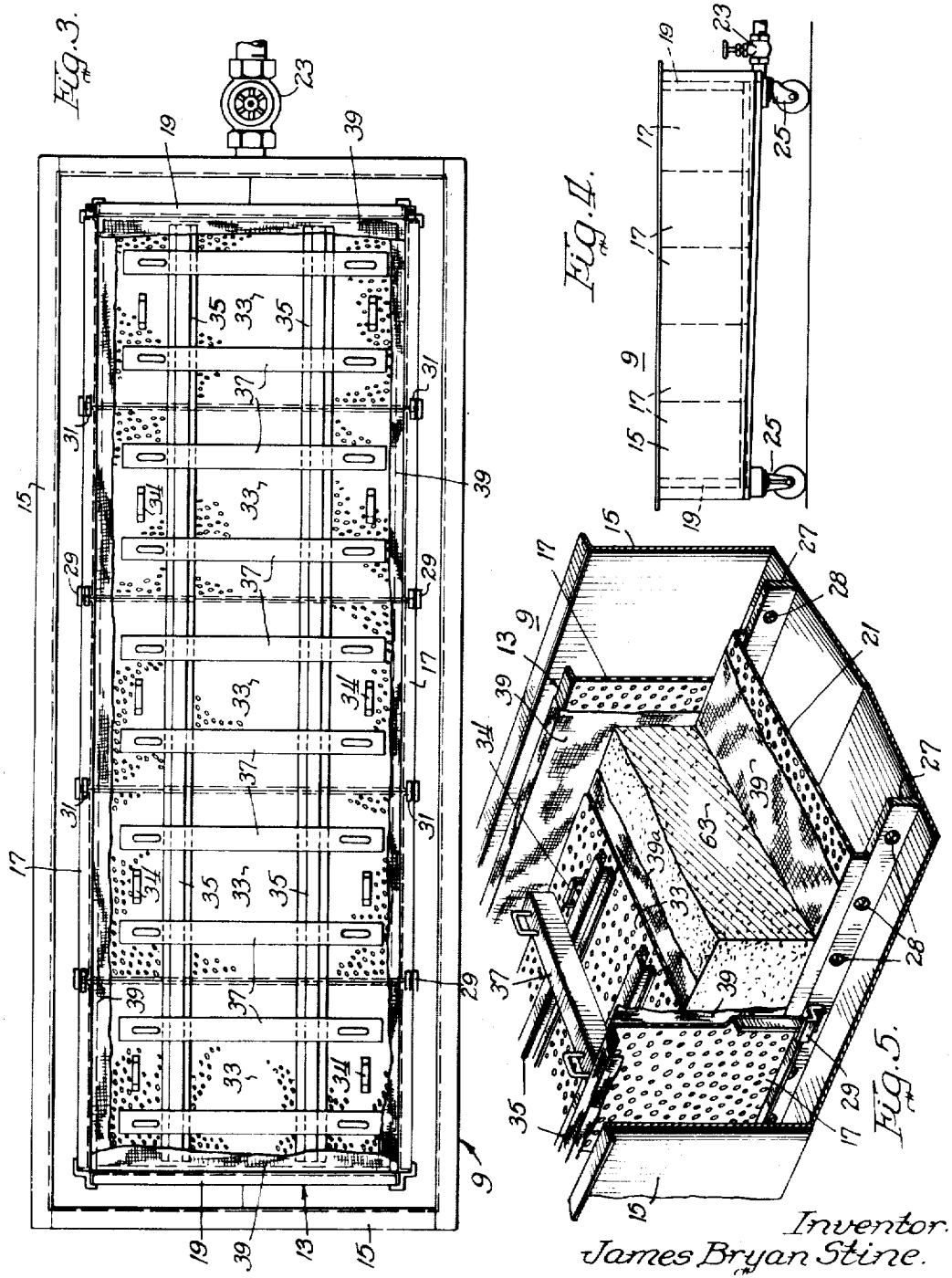

Patented Jan. 17, 1950

2,494,637

UNITED STATES PATENT OFFICE 2,494,637

CHEESE MANUFACTURE

James Bryan Stine, Chicago, Ill., assignor to Kraft Foods Company, Chicago, Ill., a corporation of Delaware Application March 5, 1947, Serial No. 732,515

1 Claim. (Cl. 99—116)

Swiss cheese, as stated in the Food and Drug Administration Regulations, issued by the Secretary of Agriculture, on November 5, 1936, is defined as "the cheese made by the Emmenthaler process, from heated and pressed curd obtained by the action of rennet on whole milk or on partly skimmed milk. It is ripened by special gas-producing bacteria causing characteristic eyes or holes." The definition further states that "The finished cheese contains, in the water-free substance, not less than 45% of milk fat." However, I regard the fat percentage figure as merely a standard set up by the Department of Agriculture and having nothing to do with the definition of the Emmenthaler process as a process.

A typical Emmenthaler process includes the following steps:

1. Inoculate cows' milk with a culture of such type or types of bacteria as are suitable for producing a cheese having the characteristic nutty flavor of "Swiss" cheese.
2. Set, or coagulate the milk, usually at a temperature of between 85° F. and 95° F.
3. Cut the curd.
4. Stir the cut curd in the whey, preferably at a temperature of about 120° F. to 138° F.
5. Separate the curd from the whey.
6. Press the curd in a form for some hours to eliminate more whey and to knit or consolidate the curd.
7. Soak the body of curd in brine for a short time, e. g. 1 to 4 days, at a relatively low temperature, for example 50° to 60° F.
8. Allow the body to drain and store in a cool room, for example 50° to 60° F. for a short time, e. g. 4 to 15 days.
9. Store the body in a hot room, for example 65° F. to 80° F., for 2 to 6 weeks, during which time the body cures, i. e. gases are developed in the body by bacterial action, usually resulting in the formation of cells or "eyes" within the body.

According to the usual procedure heretofore practiced in making cheese by the Swiss or Emmenthaler process, the curd-making operation has been effected in round bottom vats or kettles, each holding about 2500 pounds or more of milk. After the curd has been heated and stirred for a sufficient length of time, and when the cheesemaker has decided that it is time to "net" the curd, the curd is removed from the kettle in a net out of which the surplus whey is permitted to drain for a few seconds, and then the netted curd is placed into suitable forms and subjected to pressure in order to knit, consolidate, and mold the curd. According to the long practiced Swiss cheese process, the molds consist of wheel or disc-shaped forms or they may be forms of a rectangular shape, as described in my copending application filed June 15, 1946, Serial No. 677,083.

In making Swiss cheese according to the conventional practice, or in accordance with the modified process set forth in my application, Serial No. 677,083, defects or so-called nests of localized cheese of poor texture sometimes develop. The skill of the cheesemaker, and the success of the operation is, to a certain extent, indicated by the extent or presence of these localized nests in the finished cheese. So far as I am aware, no one has heretofore been able to determine exactly why these localized defects occur in the cheese, or how they can be prevented from developing in the final product.

I have discovered how to prevent the development of these nests and, incidentally, how to improve the Emmenthaler procedure in such manner as to obtain other important advantages in economy and efficiency of operation. One of the important features of my invention resides in the discovery that when Swiss curd which is ready to "net" is removed from the vat, it commences to knit or mat together, and, if this process is interrupted or disturbed in any way, or if it has proceeded for some time before the curd has been pressed into the forms, the proper knitting or consolidating of the body of curd, and the resulting cheese, will be materially impaired by the development of these so-called localized nests.

I have made the further discovery that the before-mentioned defect or disadvantage in the Emmenthaler practice can be overcome or corrected, and a much improved final product obtained, if the knitting of the curd and the mechanical pressing of the same into the form can be effected under the surface of the whey, i. e., while the curd is still submerged in the whey. According to this improved method of operation, there is no occasion to manipulate the curd or to forcibly change the shape or size of the block of curd during the critical period of knitting and draining of surplus whey. Also, in order to enable this desirable improvement to be used with success commercially, I have made certain changes in, or additions to, the equipment, which I believe to be novel and to possess material advantages over existing cheese-making equipment.

General method for Swiss cheese

The yield of finished Swiss or Emmenthaler cheese usually ranges between 6.7% and 9.5% of the weight of the milk which goes into the vat or kettle. This means that, roughly, when the whey is ready to draw, there is at least about ten times as much whey as curd, so that the volume of the block of potential cheese is, roughly, only about 10% of the volume of the whey which will have to be separated from the curd. Also, according to prevalent opinion, the block of curd whether it be of the wheel-shape in accordance with the regular practice, or of the rectangular-shape, should be about 6 to 8 inches in thickness.

Accordingly, although special straining and pressing equipment conceivably might be incorporated in the vat itself, I believe it is preferable to discharge the contents of the vat into a relatively smaller specially designed filter-mold arrangement equipped with the necessary straining facilities and preferably having a rectangular shape of a size such that the curd will form a bed, covering the bottom of the mold about 8 inches in thickness. The area of the filter-mold can, of course, be adjusted in accordance with the capacity of the vat in which is set, stirred and cooked.

Although, in certain cases, it may be feasible to use a mold having a foraminous bottom and imperforate side walls, convenience and speed of operation are enhanced by making the side walls also foraminous, so that the whey can escape quickly from the mold while the latter is being filled with curd and also subsequently.

However, particularly if a mold with foraminous side walls be employed, it is advisable to enclose the mold in a tank, the capacity of which does not greatly exceed that of the mold and the walls of which tanks are not too far separated from the side walls of the mold. This feature is advantageous, because, according to my improved process, it is advisable to keep the curds fully submerged in the whey at all times until the bed of curd has been laid, and preferably until it has been compressed into substantially its final shape and size.

Although, it is possible, and sometimes desirable, to make a preliminary drawing of supernatant whey from the vat before discharging the curd, it is nevertheless advisable to discharge a considerable volume of whey with the curd, so that there is always enough liquid present to sluice off, to carry, and to submerge the curd. Therefore, the volume of the tank and mold, unless they be of excessive height, will ordinarily be insufficient to accommodate, without overflowing, the large volume of curd and liquid discharged from the vat into the mold. Consequently, it is desirable to equip the tank with a valve-controlled outlet by which the level of liquid in the tank and mold can be regulated on the one hand to prevent overflow of the tank, and on the other hand to prevent exposure of the curd during the operation.

After the vat has been emptied into the mold, the next step in the procedure is to mechanically press the curd body into the desired shape by covering the top of the curd body with pressure plates, preferably perforated, so as to permit expelled whey to pass therethrough. The plates are then weighted and the whey is allowed to escape freely from the tank as it drains out of the curd.

The formed and knitted bed or block of curd, if of large area, may be subdivided into sections of more convenient size. The blocks are then finished off into merchantable cheese in accordance with the conventional procedure or the modified procedure described in my application Serial No. 677,083.

Some of the features of my improved procedure as above described may be employed in connection with the making of cheese of types other than Swiss, American, for example, and this is also true of the apparatus employed. Instead of limiting the size of a batch of milk in the Swiss cheese procedure to about 2,000 lbs., batches of 10,000 lbs. or more can be handled with great facility. Furthermore, the batch may be handled in a large round tank of dimensions limited only by the facility with which the cutting of the curd may be effected.

The Swiss cheese process may also be carried out, according to my improved procedure, in a rectangular vat such as is also used for the manufacture of American type cheese by the conventional Cheddar process. Hence, the same cheese factory can make either Swiss or American cheese depending upon the market or other conditions because the same pieces of equipment may be used in the manufacture of either type. Furthermore, the cheese-making operation, whatever the type of cheese, can be carried on more efficiently and more economically in accordance with my improved process and equipment.

In the drawings,

Fig. 1 is a diagrammatic view of apparatus adapted for use in making cheese by my improved method;

Fig. 2 is a view similar to Fig. 1, showing a modified apparatus;

Fig. 3 is a plan view of my novel filter-mold and tank;

Fig. 4 is a side elevational view of the filter-mold and tank illustrated in Fig. 3;

Fig. 5 is a fragmentary, perspective view of the filter-mold and tank illustrated in Figs. 3 and 4; and Fig. 6 is a view similar to Fig. 4 showing a modified supporting structure.

The apparatus which is used with my method for making Swiss cheese departs greatly from the traditional small hemispherical kettle, net, and wheel-shaped forms that were formerly used in the manufacture of this type cheese. As illustrated, the apparatus includes a vat of any convenient size, and a novel filter-mold 9. The vat 7 may be of any convenient shape. I have used with success a rectangular steam-jacketed vat 7 (Fig. 1) of the type used to set and cook curd for American or Cheddar type cheese or the vat may be round as shown in Fig. 2. The vat is desirably provided with mechanical stirrers 11.

The filter-mold 9 includes a mold basket 13 and a tank 15. The mold basket 13 may be of any convenient size, but we have found a suitable size for use with a 10,000 pound batch of milk should have horizontal dimensions of about 32 by 100 inches. A mold basket 13 having this area produces a block of curd which has a thickness of about 8 inches when a batch of 10,000 pounds of milk is being treated. The mold basket 13 has sides 17, ends 19, and a bottom 21, which are foraminous so as to allow free drainage of whey therethrough.

A pair of longitudinally extending support members 27 are disposed in the bottom of the tank 15. The upper surfaces of the supporting members 27 are level and form a stable and level base for the mold basket 13, so that the curd body deposited therein will be an even depth. Suitable drain holes 28 are provided in the longitudinal supporting members 27 so as to allow free drainage of whey from all portions of the tank 15. The tank 15 has a sloping bottom that drains to a valve 23 which is adapted to control the flow of whey out of the tank 15. The tank 15 is desirably supported upon wheels 25 to allow movement about the floor of the cheese factory.

The bottom 21 of the mold basket 13 is fabricated from a plurality of perforated plates. Each plate has a flanged portion which is adapted to be clamped to the adjacent plate, and the plates are proportioned so that they are supported upon the supporting members 27 in the bottom of the tank and span the opening therebetween. The sides 17 of the mold basket are vertically-extending, perforated plates supported in clips 29, which are attached to the supporting members 27 in the tank. The side plates are attached together at their upper ends by suitable clamps 31. The ends 19 of the mold are also perforated plates, and are adapted to be clamped to the sides 17 and to the bottom 21 of the mold basket 13. These ends 19 may be clamped in any desired position within the mold basket 13, thereby allowing the area of the mold to be adjusted to accommodate various sized batches of curd or to determine the depth of the curd bed deposited. It has been found that to obtain the preferred depth of curd bed for Swiss cheese about one square inch of mold area should be allowed for each three pounds of milk being processed.

Cover or press plates 33 are provided for the mold basket 13, which comprise perforated, metal plates adapted to fit within the basket. The cover plates 33 have attached thereto suitable handles 34, for placing them in position and for removing them after the curd block is formed.

Removable, longitudinally-extending channel sections 35, are provided to extend the entire length of the mold and they are supported upon the cover plates 33. These channel members 35 support press weights 37, and serve to uniformly distribute the weight load across the entire upper surface of the curd block. The press weights 37 may weigh 40 to 50 pounds. All of the materials used in the fabrication of the tank 15 and the mold basket 13 should desirably be stainless steel or some other material which may be easily cleaned and which will not have a deleterious effect on the cheese being made.

Before use the interior of the mold basket 13 is lined with cheesecloth 39 by placing the cloth over the inner surfaces of the bottom, sides, and ends of the mold basket before they are assembled. The cloth 39 is held in place by the clamping action effected by the sections when they are joined together. As a substitute for cheesecloth, a porous cellulosic product having a gauze face on one side, has been used. The tank 15 which surrounds the mold basket 13 is proportioned so that the space between the basket 13 and the tank 15 is but a small fraction of the volume of the tank. This size relationship permits the rapid drainage of whey from the curd block as there is then but a small amount of whey needed to cover the block of curd.

The same tank may be used with different molds by providing a lifting frame which fits under the bottom plates of the mold basket. Conveniently this can be accomplished by making the longitudinal supporting members 27 detachable from the bottom portion of the tank. In the modification illustrated in Fig. 6 the supporting members 27a are held in position by brackets 41 which are attached to the bottom of the tank 15.

Transverse cross members 43 are connected between the longitudinal members 27a at spaced intervals to strengthen the structure. The longitudinal supporting members are provided with straps 45 which are adapted to be connected to a lifting device which is operable to lift the block of curd and the mold basket 13, as a unit, out of the tank 15. This mold basket and tank arrangement allows the use of a number of mold baskets with but one tank. The basket may be filled with curd and whey, the whey may be drained, and the basket containing the curd block may be removed before the curd has completely knit. While the curd block is knitting in the basket a second basket may be placed in the tank and another curd block formed.

The curd and whey may be transferred from the vat 7, in which they are cooked, to the filter mold 9 in any conventional manner. As illustrated in Figs. 1 and 2, the curd and whey may flow by gravity into the filter mold 9 or they may be pumped by a centrifugal pump (of a type which will handle the curd). In the illustrated structures the vats are provided with drain pipes 47 equipped with control valves 49 and universal fittings 51. The discharge end of the drain pipe 47 is provided with a distributing manifold 53 which has a plurality of spaced-apart openings whose total area is slightly less than that of the drain pipe 47. This arrangement results in the maintenance of a head of whey which aids in moving curd through the drain pipe 47. The entire draining system is counterbalanced by a suitable arrangement such as the counterweight and pulley 55, as illustrated in Fig. 1.

The connection between the drain pipe 47 and the vat 7 desirably includes a sump 57 which cooperates with tubular screen member 59. The use of the screen member 59 allows the cheesemaker to draw off supernatant whey without losing curd. A whey disposal system 61 is located adjacent the position in which the filter mold 9 is located during the draining of the vat 7 and is adapted to receive the whey discharged from the valve 23 in the tank 15.

*Specific method for Swiss cheese*

The following is a description of my improved process, it being understood, however, that the details of the procedure followed may be varied to suit individual conditions and preferences. The following description is that of the process as successfully practiced in producing Swiss cheese at Milledgeville, Illinois, in the winter of the year 1946–1947.

The milk analyzed about 3.5 percent of milk fat. None of the fat was separated from the milk, but before it entered the vat it may have been pasteurized in a flash plate pasteurizer, held at a temperature of 158–162° F., for about seventeen seconds. This temperature produces a phosphatase-negative milk.

The vat used was a long, rectangular, steam jacketed, vat 7 which was adapted to hold over about 10,000 pounds of milk, and was exactly the same as those used for the usual Cheddar or American cheese process. About 10,000 pounds of milk was introduced in the vat 7, and at the time the milk entered the vat the acidity was normal. The filling of the vat 7 took about ten to fifteen minutes, and the milk was vigorously stirred during this time.

When the vat 7 was full, there was added to the milk, in addition to rennet, the normal amounts of the usual cultures, for example:

1. *Lacto-bacillus bulgaricus.*
2. *Streptococcus thermophilus.*
3. *Propionibacterium shermani.*

The temperature of the milk was then raised to 88-92° F., stirring meanwhile, and the stirring was continued for two or three minutes longer, and then discontinued. The setting of the curd took place in the usual interval and, as soon as a soft set was reached the curd was cut in the usual manner. The cut curd was then foreworked, (alternately stirring it and allowing it to settle to the bottom of the vat, each period extending for about ten minutes) until the curd started to firm. Usually during one of the settling periods, about ⅓ of the supernatant whey was drained off by placing the screen member 59 in the sump 57 and opening the valve 49. This foreworking usually took 45 to 60 minutes, after which the power stirrers 11 were attached.

After the foreworking period, the batch was heated to about 126° F. in approximately 30 minutes, during all of which time the contents of the vat were vigorously stirred with the power stirrers 11. When the temperature of the curd in the vat reached about 126° F. it was held there, and the batch was cooked until the curd had the appearance of the curd in the normal Swiss process about ten minutes before the normal "netting" time. The exact time was indicated when a lump of curd pressed in the hand broke down and left a slightly gummy lump. When this point was reached, the contents of the vat 7 were sluiced into the mold basket 13 of my novel filter mold 9, which has been described in a preceding section.

Before the time for drawing off the batch, the filter mold 9 was prepared by lining the bottom, the sides and the ends of the mold basket 13 with cheesecloth, as has been described. The end dams were adjusted so that the area of the basket 13 was about 32 by 100 inches as this was found to be about the area necessary to form a block of curd 8 inches deep, when 10,000 pounds of milk was being processed. The mold basket 13 and tank 15 were filled with warm, strained whey, just before the time that the batch was to be drawn from the vat, by use of the screen member 59 and the drain pipe 47. The discharge manifold 53 from the vat was then introduced under the level of the whey in the tank.

At the optimum time for drawing, which was determined by pressing the curd as before described, the screen 59 was removed and the valve 49 under the vat 7 was opened, and the curd and whey were run into the mold basket 13 under the surface of the warm whey that was placed therein. As the batch drained into the filter mold 9, the drain valve 23 of the tank was opened to drain clear whey from the tank 15 in relation to the flow of curd and whey into the filter mold 9. Precautions were taken at all times to insure the presence of sufficient whey in the mold basket 13 and the tank 15 to adequately cover the bed of curd. After the contents of the vat 7 were all drained into the mold basket 13 (about ten minutes) the drain valve 23 of the tank 15 was closed while several inches of whey remained over the curd bed. A piece of cheesecloth 39a Fig. 5) was spread evenly over the surface of the liquid whey, and the cover or press plates 33 were placed over the top of the cheesecloth 39 and properly weighted.

The weighting varies with the changes in the milk during the seasons, etc. but at this time weights totaling about 500 pounds, including the press plates, were distributed evenly over the surface of the curd bed. The residual whey was then drained off rapidly, and the curd bed, indicated at 63 in Fig. 5, was allowed to set for about ½ hour.

After the ½-hour period had elapsed and the curd had started to knit firmly, the weights 37 and press plates 33 were removed, and the top surface of the block of curd 63 was "dressed." This operation consisted in removing the layer of cheesecloth 39a which extended across the upper surface of the curd block 63, the excess whey was squeezed from the cheesecloth; the cheesecloth was then replaced and smoothed out, a layer of heavy, absorbent cloth, such as burlap, was placed on the upper surface of the cheesecloth 39a; and then the press plates 33 and weights 37 were replaced.

After about six hours or more, the curd block was cut with stainless steel knives into the desired sizes, as for example, rectangular blocks about 32 by 20 inches, which weighed about 180 pounds. These blocks were then put in the brine tank for the first step of curing and the curing was then effected either in accordance with the conventional Swiss process, or in accordance with the method of my copending application Serial No. 677,083.

Rind-forming was accelerated if, when the block of curd was cut, pieces of cheesecloth were forced between the cut blocks so that some of the moisture on the surface of the blocks was rapidly absorbed. Then, after an hour or two, when the blocks were removed they were observed to have a rather hard, thin, rind formed on their surfaces.

One of the most important steps in forming the curd bed in the mold was found to be the desirability of running the curd into the mold under the surface of warm whey to prevent its chilling and early knitting. The time element in sluicing the curd and whey from the vat was desirably short, (about ten minutes) but longer times have been used if the draining was begun early enough to avoid overcooking the batch.

The cured cheese resulting from my improved process is substantially devoid of nests and other defects that are common to Swiss cheese made by the traditional method. The flavor and texture of the cured cheese is the same as of the finest Swiss cheese and, in addition, there is a large saving in the labor of turning and dressing the individual cheeses before they are cured.

More cheese is made from a batch of milk by my improved method, and with my apparatus, than with the previous procedure. The slow filtering action of the foraminous surfaces of the mold allows the clear whey to run through relatively rapidly, but acts to retain the fine particles, or so-called cheese "dust," which is lost by the conventional method of netting.

The features of my invention that are believed to be new are expressly set forth in the appended claim.

I claim:

An improvement in that part of the Emmenthaler cheese process which follows the steps of setting and cutting the curd and heating and stirring the mixture of curd and whey in a vat, which comprises the steps of (1) discharging the heated mixture from the vat while maintaining the curd submerged in whey, (2) confining and applying mechanical pressure to the discharged curd to form the curd into a body of the desired shape while the discharged curd is submerged in the whey, (3) draining the whey from the formed body of curd, (4) maintaining the formed body of curd in a quiescent state until it becomes firmly knit, and (5) curing the knitted curd.

JAMES BRYAN STINE.

REFERENCES CITED

The following references are of record in the file of this patent:

UNITED STATES PATENTS

| Number | Name | Date |
|---|---|---|
| Re. 21,834 | Miollis | June 17, 1941 |
| 65,211 | Greene | May 28, 1867 |
| 1,334,693 | Doane | Mar. 23, 1920 |
| 1,475,398 | Kielsmeier | Nov. 27, 1923 |
| 1,499,390 | Matheson | July 1, 1924 |
| 1,578,820 | Gere | Mar. 30, 1926 |
| 2,324,636 | Miollis | July 20, 1943 |
| 2,325,217 | Beers | July 27, 1943 |
| 2,366,553 | Petersen | Jan. 2, 1945 |